US008238979B2

(12) United States Patent
Rajamani et al.

(10) Patent No.: US 8,238,979 B2
(45) Date of Patent: Aug. 7, 2012

(54) SYSTEM AND METHOD FOR MOBILE DEVICE DISPLAY POWER SAVINGS

(75) Inventors: Krishnan Rajamani, San Diego, CA (US); Samir Soliman, San Diego, CA (US); Atul Suri, San Diego, CA (US); Sivaramakrishna Veerepalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 12/580,983

(22) Filed: Oct. 16, 2009

(65) Prior Publication Data

US 2010/0261506 A1    Oct. 14, 2010

Related U.S. Application Data

(60) Provisional application No. 61/169,088, filed on Apr. 14, 2009.

(51) Int. Cl.
*H04B 1/38* (2006.01)
(52) U.S. Cl. ........................ 455/566; 455/41.2; 455/574
(58) Field of Classification Search .................. 455/566, 455/41.2, 556.2, 550.1; 345/2.3
See application file for complete search history.

(56) References Cited

U.S. PATENT DOCUMENTS

| 7,113,811 | B2* | 9/2006 | Goris et al. ................... 455/574 |
| 7,657,227 | B2* | 2/2010 | Doan et al. ................... 455/41.3 |
| 7,885,690 | B2* | 2/2011 | Shen et al. ................... 455/566 |
| 7,937,113 | B2* | 5/2011 | Klinghult et al. ............ 455/566 |
| 8,023,975 | B2* | 9/2011 | Wickman et al. ............ 455/466 |
| 8,054,303 | B2* | 11/2011 | Saeki ............................. 345/204 |
| 8,155,305 | B2* | 4/2012 | Yamazaki et al. ........ 379/433.07 |
| 2005/0179653 | A1* | 8/2005 | Hamon ......................... 345/156 |
| 2007/0124775 | A1 | 5/2007 | DaCosta |
| 2007/0271525 | A1 | 11/2007 | Han et al. |
| 2008/0108392 | A1 | 5/2008 | Moon et al. |
| 2011/0124376 | A1* | 5/2011 | Kim et al. ..................... 455/566 |

FOREIGN PATENT DOCUMENTS

WO    WO2007061157 A1    5/2007

OTHER PUBLICATIONS

International Search Report and Written Opinion—PCT/US2010/031016—ISA/EPO—Nov. 1, 2010.

\* cited by examiner

*Primary Examiner* — Sharad Rampuria
(74) *Attorney, Agent, or Firm* — Donald C. Kordich

(57) ABSTRACT

Systems and methods displaying information from a mobile device are described herein. One embodiment of the disclosure provides a method comprising detecting a wireless connection between a mobile device and an external display device. The method further comprises adjusting a display of the mobile device based on at least the detection of the wireless connection.

34 Claims, 7 Drawing Sheets

SYSTEM AND METHOD FOR MOBILE DEVICE DISPLAY POWER SAVINGS

CROSS REFERENCE TO RELATED APPLICATION(S)

This application claims the benefit of U.S. Provisional Application No. 61/169,088, filed Apr. 14, 2009, the entire content of which is incorporated herein by reference.

BACKGROUND

1. Field

This application relates generally to mobile devices, and more specifically, to cell phone displays.

2. Background

Mobile devices (e.g., phones, smartphones, Personal Digital Assistants (PDAs), Ultra-Mobile Personal Computers (UMPCs), Mobile Internet Devices (MIDs), etc.) may be connected to external monitors in order to provide a larger and/or secondary display. In such cases, additional power consumption from the battery of the mobile device is required to drive the external display. Thus, a need exists to offset this additional power consumption.

SUMMARY

A summary of sample aspects of the disclosure follows. For convenience, one or more aspects of the disclosure may be referred to herein simply as "some aspects."

Methods and apparatuses or devices being disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the features being described provide advantages that include improved power consumption in a mobile device when driving an external display.

One embodiment of this disclosure provides a method of displaying information from a mobile device. The method comprises detecting a wireless connection between a mobile device and an external display device. The method further comprises adjusting a display of the mobile device based on at least the detection of the wireless connection.

Another embodiment of this disclosure provides a mobile device comprising a display. The mobile device further comprises a first processing circuit configured to detect a wireless connection with an external display device. The mobile device further comprises a second processing circuit configured to adjust the display based on at least the detection of the wireless connection.

Yet another embodiment of this disclosure provides an apparatus. The apparatus comprises means for detecting a wireless connection between a mobile device and an external display device. The apparatus further comprises means for adjusting a display of the mobile device based on at least the detection of the wireless connection.

A further embodiment of this disclosure provides a computer program product comprising computer-readable medium. The computer-readable medium comprises code for causing a computer to detect a wireless connection between a mobile device and an external display device. The computer-readable medium further comprises code for causing a computer to adjust a display of the mobile device based on at least the detection of the wireless connection.

DETAILED DESCRIPTION

Figure 1:
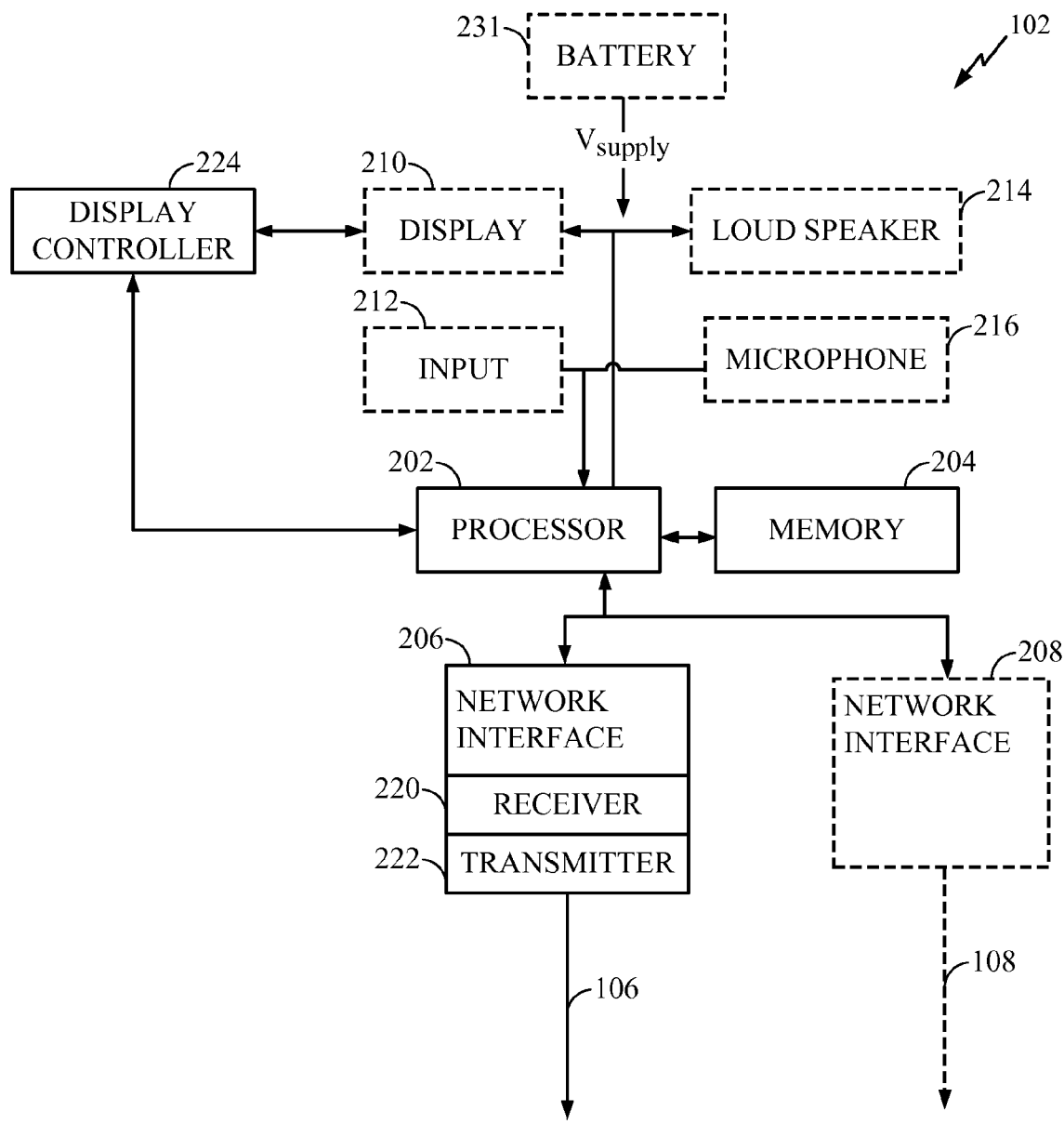
FIG. 1 is a block diagram illustrating an example of a mobile device.

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects connections between mobile devices and displays may be based on wireless protocols. In some aspects, communication channels between devices may be based on a wired data transmission.

Mobile devices (e.g., phones, smartphones, Personal Digital Assistants (PDAs), Ultra-Mobile Personal Computers (UMPCs), Mobile Internet Devices (MIDs), etc.) typically have small display areas due to size constraints. Mobile devices, however, may be attached to external display devices with larger display areas. The mobile device may then drive the external display device to display information. However, increased power consumption occurs in the mobile device to drive the external display device. Methods and devices are described herein to reduce power consumption at a mobile device when the mobile device is connected to an external display device. Set forth below are some architectures that may be used in conjunction with the described methods and devices.

Personal or body area networks may be defined by devices that have "paired" with each other. Pairing is a process by which devices register with each other, including under user control. Once paired, devices typically can communicate with each other whenever they are within range and active without re-performing the pairing process.

Before pairing, devices must first discover each other, for example, by entering a discoverable state in which devices discover each other through the exchange of discovery messages. Upon discovery, devices may pair with each other. Pairing is at least partly a security function to limit pairing to particular devices. For example, pairing may include an exchange of messages that may include password authentication schemes in which first device must respond with a password (such as a four digit number, which is often fixed at the factory for a device) to a second device to prevent unauthorized or undesired pairing of devices. In networking protocols such as Bluetooth, discovery and pairing are separate procedures. However, they are most often performed together. For some wireless devices, such complexity (e.g., password entry) merely makes device pairing difficult and cumbersome for many users. It has been found that adjusting the pairing process to be based on a pairable state, and optionally, on the temporal and physical co-location of devices, can simplify the process of pairing devices in a personal area network. According to one aspect, a device may enter a pairable state, e.g., based on input from a user control (e.g., by depressing a control button on a device). When such a device receives a discovery and pairing message from another device (which may also be placed in the pairable state by the user), the two devices may pair without further user interaction. Pairing with particular devices can be controlled, for example, based on the pairable state being maintained for a specified period during which time the other device is configured to be pairable or by limiting pairing to devices within a specified distance, or combinations thereof.

FIG. 1 is a block diagram illustrating an example of a mobile device 102. The device 102 includes a processor 202 that is in communication with a memory 204 and, optionally, a network interface 206 for communicating via the wireless link 106. Optionally, the device 102 may also include one or more of a display 210, a user input device 212 such as a key, touch screen, or other suitable tactile input device, a loudspeaker 214 comprising a transducer adapted to provide audible output based on a signal received over the wireless link 106 and/or a microphone 216 comprising a transducer adapted to provide audible input of a signal that may be transmitted over the wireless link 106. For example, a phone may include the display 210 adapted to provide a visual output of a graphical user interface (GUI). The network interface 206 may transmit and receive signals as CDMA, GSM, AMPS or other known signals that are used to communicate within a wireless cell phone network.

The display 210 may be in communication with a display controller 224. The display controller 224 may further be in communication with the processor 202. The display controller 224 may be configured to send control messages to the display controller 224. For example, the display controller 224 may adjust an amount of power used by the display 210. The display controller 224 may turn on/turn off the display 210, adjust a brightness of the display 210, etc. The display controller 224 may receive information from the processor 202 for determining how to adjust an amount of power used by the display 210. For example, the processor 202 may receive information from the network interface 208 that a wireless or wired connection is formed with another device. The processor 202 may forward this information to the display controller 224. The display controller 224 may then adjust the power used by the display 210, such as by turning off the display 210.

The network interface 206 may include any suitable antenna (not shown), a receiver 220, and a transmitter 222 so that the exemplary device 102 can communicate with one or more devices over the wireless link 106. Optionally, the network interface 206 may also have processing capabilities to reduce processing requirements of the processor 202.

Optionally, the device 102 may include a second network interface 208 that communicates over a network (e.g., a wide area network such as the Internet) via a link 108. For example, the device 102 may provide connectivity to the network via a wired or wireless communication link. In addition, it should be appreciated that one or more of the devices 102 may be portable or, in some cases, relatively non-portable. The second network interface 208 may transmit and receive RF signals according to the IEEE 802.11 standard, including IEEE 802.11(a), (b), or (g), the BLUETOOTH standard. In addition, the second network interface 208 may comprise any suitable wired network interface such as Ethernet (IEEE 802.3) or USB. Second network interface 208 may also comprise a suitable wired display interface such as a Mobile Display Digital Interface (MDDI). The device 102 may also include a third interface (not shown) similar to the second network interface 208.

The device 102 may include a battery 231 to provide power to one or more components of the device 102. The device 102 may comprise at least one of a phone, smartphone, Personal Digital Assistant (PDA), Ultra-Mobile Personal Computer (UMPC), Mobile Internet Device (MID), or any other mobile device. In particular, the teachings herein may be incorporated into (e.g., implemented within or performed by) a variety of the devices 102.

The components described herein may be implemented in a variety of ways. Referring to FIG. 1, the device or apparatus 102 is represented as a series of interrelated functional blocks that may represent functions implemented by, for example the processor 202, software, some combination thereof, or in some other manner as taught herein. For example, the processor 202 may facilitate user input via the input devices 212. Further, the transmitter 222 may comprise a processor for transmitting that provides various functionalities relating to transmitting information to another device 102. The receiver 220 may comprises a processor for receiving that provides various functionality relating to receiving information from another device 102 as taught herein.

As noted above, FIG. 1 illustrates that in some aspects these components may be implemented via appropriate processor components. These processor components may in some aspects be implemented, at least in part, using structure as taught herein. In some aspects, a processor may be adapted to implement a portion or all of the functionality of one or more of these components. In some aspects one or more of the components represented by dashed boxes are optional.

Figure 2:
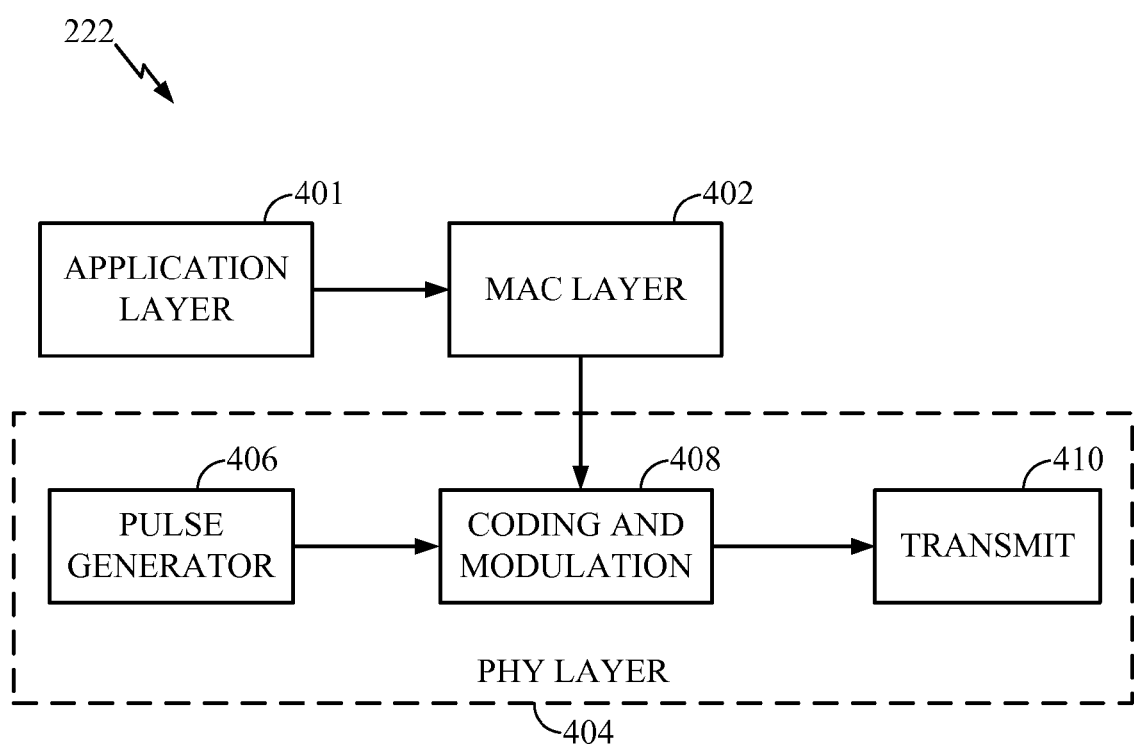
FIG. 2 is a block diagram illustrating an example of the transmitter of the mobile device of FIG. 1.

FIG. 2 is a block diagram illustrating an example of the transmitter 222 of the device 102. As would be apparent to one of skill in the art, in the illustrated block diagram of FIG. 2, logical modules of the device 102 are illustrated in terms of a layered, abstract description for a communications network. As noted below, each layer may comprise one or more logical modules that may be implemented in software, hardware, or any suitable combination of both. The transmitter 222 may include: (i) an application layer 401 that provides information to a data link or media access control (MAC) layer 402 for transmission, (ii) a media access control (MAC) layer 402 that receives data from the application layer 401 and provides it to a physical layer 404, and (iii) a physical (PHY) layer 404 that receives data from the MAC layer 402 and transmits the data over the wireless channel 106. In the illustrated transmitter 222, the PHY layer includes a pulse generator 406, a coding and modulation block 408, and a transmit block 410. A phase locked loop (PLL) (not shown) may provide timing signals to the PHY layer. The pulse generator 406 generates waveforms such as Gaussian pulse waveforms. In some embodiments, transmitter 222 does not include a pulse generator. The coding and modulation block 408 codes the information signal provided by the MAC layer 402 using a coding scheme such as convolutional coding, block coding or concatenated coding and modulates the pulse signal based on the coded information signal using a scheme such as pulse position modulation, pulse amplitude modulation, or transmitted reference modulation. The transmit block 410 transmits the modulated pulse signal. Functions of the transmit block 410 may include amplifying the modulated pulse signal for transmission and providing the signal to an antenna.

Figure 3:
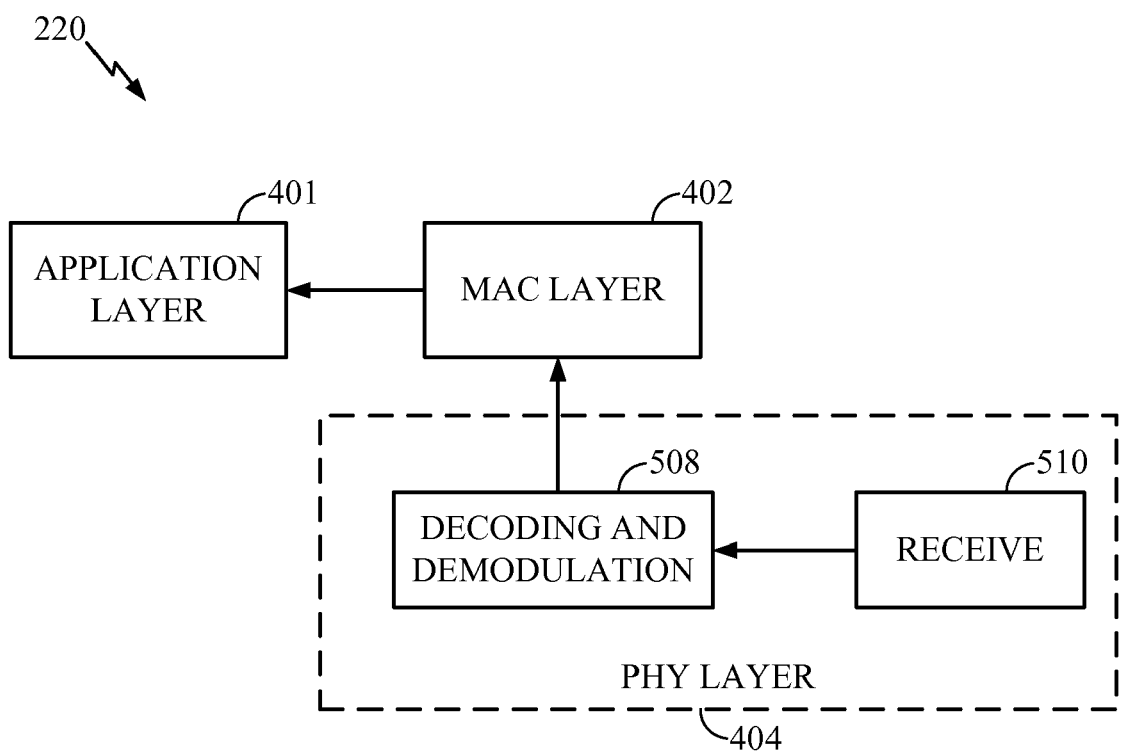
FIG. 3 is a block diagram illustrating an example of the receiver of the mobile device of FIG. 1.

FIG. 3 is a block diagram illustrating an example of the receiver 220 of the device 102. As would be apparent to one of skill in the art, in the illustrated block diagram of FIG. 3, logical modules of the device 102 are illustrated in terms of a layered, abstract description for a communications network. As noted below, each layer may comprise one or more logical modules that may be implemented in software, hardware, or any suitable combination of both. In FIG. 3, the receiver 220 includes the application layer 401 and the MAC layer 402. The PHY layer 404 is in communication with the MAC layer 402. The PHY layer 404 of the receiver includes a demodulation and decoding block 508 and a receive block 510. The receive block 510 may include components (not shown) that may comprise an antenna, a power amplifier, and other suitable receiver components. The receive block 510 receives a wireless signal and provides that signal to the demodulation and decoding block 508, which demodulates and decodes the signal and provides received data to the MAC layer 402.

The receiver 220 and the transmitter 222 may employ a variety of wireless physical layer schemes. For example, the physical layer 404 of the receiver 220 and the transmitter 222 may utilize some form of CDMA, TDMA, OFDM, OFDMA, or other modulation and multiplexing schemes.

Figure 4:
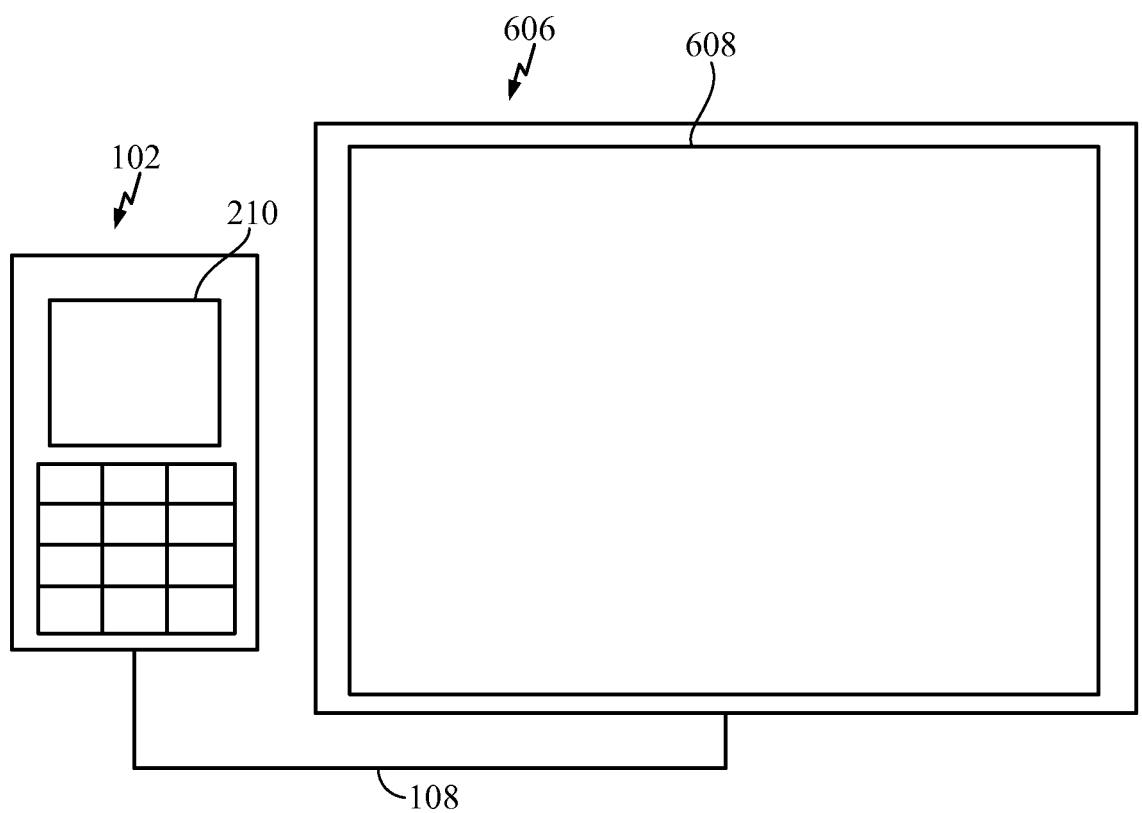
FIG. 4 is a diagram of an embodiment of a mobile device of FIG. 1 connected to an external display device.

FIG. 4 is a diagram of a mobile device shown in FIG. 1 connected to an external display device. Mobile device 102 has a display 210. External display device 606 has a display 608. In some embodiments, the displays 210 and 608, such as, e.g., interferometric modulating MEMS devices, LCDs, OLEDs, CRTs, DLPs, etc., displays may include a light source that is configured to light an array of display elements to an appropriate level for viewing. In an example embodiment, the array of display elements may include pixels filled with liquid crystals. In combination with the light source, a light guide may be coupled to the array of display elements proximate the light source to distribute light across the array of display elements. Light guides may be positioned in various orientations with respect to the display elements, such as behind the display elements, e.g., a backlight, or in front of the display elements, e.g., a frontlight.

In certain embodiments, the light source comprises a backlight. The backlight of certain such embodiments comprises a light guide slab that: receives light from a light generator (e.g., an LED, where light from the LED is injected along an edge of the light guide slab), guides the light along the light guide slab, and redirects and emits the light towards the device. Accordingly, the backlight provides illumination that may be substantially uniform or non-uniform to take advantage of device transmission and reflection properties in order to create patterns, graphics, or images with luminance or chromatic contrast. In certain embodiments, the light source comprises a fluorescent light generator. In other embodiments, the light source comprises an incandescent light generator, an LED, or another type of light generator. In certain other embodiments, the light source can comprise a substantially reflective surface which reflects or emits a substantial portion of the light which reaches the light source after being transmitted through an array of display elements. Additionally, in some embodiments, the light incident upon the reflective surface includes ambient or natural light, such as light from the sun, for example.

In certain embodiments, the light source is responsive to a signal (e.g., from the display controller 224, another controller, a processor, etc.) by changing between multiple states. For example, in certain embodiments, in response to the signal, the light source can turn "on" and "off." In other embodiments, the light source may be responsive to the signal by changing to emit light having different properties, such as, for example, light having different brightness levels or different colors. In one embodiment, the light source is responsive to the signal by changing from emitting light having a first selected brightness to emitting light having a second selected brightness different from the first selected brightness. In certain embodiments, the light source is responsive to the signal by changing from emitting light having a first selected color to emitting light having a second selected color different from the first selected color.

In certain embodiments, the array of display elements is responsive to a signal (e.g., from the display controller 224, another controller, a processor, etc.) by changing between multiple states. For example, in certain embodiments, in response to the signal, the pixels can change states such as to allow more or less light from the light source to reach the user. By adjusting the state of each pixel in the array, images may be formed.

Mobile device 102 and external display device 606 may be connected wirelessly or by wire. Mobile device 102 may have a network interface or display interface such as, for example, second network interface 208 as shown in FIG. 1. External display device 606 may have a similar network interface or display interface. Mobile device 102 and external display device 606 may communicate using these interfaces when connected. Connection 108 may be a wireless or wired connection between external display device 606 and mobile device 102.

When mobile device 102 is not connected to external display device 606 via connection 108, the display 210 may be powered on and power may be consumed to power the backlight and to power the pixels. Accordingly, the display 210 provides a user with visual information such as a GUI of the mobile device. In one embodiment, when mobile device 102 is connected to an external display device 606 via connection 108, the mobile device detects the connection 108 and sends information to external display device 606 to display visual information on display 608. Formatting and sending such information from mobile device 102 to drive display 608 requires processing which leads to greater power consumption.

In some embodiments, the display controller 224 of the mobile device 102 adjusts the power consumption of display 210 when connected to external display device 606 via connection 108. In one such embodiment, the display controller 224 turns off power to the backlight of display 210 when the mobile device 102 is connected to external display device 606 via connection 108. In other embodiments, display controller 224 reduces the refresh rate of the display 210. In yet other embodiments, the display controller 224 turns off power to the backlight and the pixels of display 210. In another embodiment, the display controller 224 reduces the brightness level of the backlight of display 210. In some embodiments, the display controller 224 does not adjust the power consumption of display 210 if the mobile device 102 is connected to an external power source such as a wall charger. In yet other embodiments, the display controller 224 adjusts power consumption of display 210 based on the level of charge left in the battery 231 powering the mobile device 102. In one embodiment, the display controller 224 may adjust the power consumption of display 210 only if the level of charge left in the battery 231 is less than 50% of a maximum level of charge of the battery 231. In another embodiment, display 210 may support N different brightness levels and the display controller 224 may set display 210 to a different brightness level for different ranges of charge level of the battery 231 (e.g. level 1 corresponds to charge level 0%-20%, level 2 corresponds to charge level 21%-51%, and level 3 corresponds to charge level 52%-100%). Such ranges may be uniform or non-uniform.

In some embodiments, the choice of how to adjust the power consumption of the display 210 is based upon certain preferences. In some embodiments, these preferences may be stored on either the memory 204 of the mobile device 102, or on the external display device 606. In one exemplary embodiment, the preferences are based upon characteristics of display 608 and/or display 210. For example, in one embodiment the display 210 may comprise a touch screen. When the mobile device 102 with a touch screen is connected to external display device 606, a preference file may indicate that mobile devices with a touch screen should not adjust the power to the display screen. In another embodiment, the display 210 may not comprise a touch screen. When a mobile device 102 without a touch screen is connected to external display device 608, the preference file may indicate that the display 210 should be turned off. Further, each individual mobile device 102 may have a unique preference file associated with it such that when it is connected, it adjusts according to the preference file. There may be a default preference file for each device with certain default settings (e.g. reduce refresh rate when mobile device 102 is connected to the external display device 606). In other embodiments, where the display 210 is a touch screen and display 608 is a touch screen, the preference may be set so display 210 turns off, and control of mobile device 102 is achieved via input received by touch screen 608.

In some embodiments, the choice of how to adjust the power consumption of the display 210 is based upon user input. The user input may be received via input 212 of the mobile device 102, the external display device 606, or some other input device that interfaces with either the mobile device 102 or the external display device 606. The user input may be used to edit the stored preferences such that after the initial adjustment, the user does not need to change the default setting each time the devices 102 and 606 are connected. In another embodiment, the user input may only be used once to override the default settings. The user may select whether it wants display 210 to reduce refresh rate, turn off, etc.

For example, the input device may be a keyboard, rollerball, pen and stylus, mouse, or voice recognition system. The input device may also be a touch screen. The user may respond to prompts on the display by touching the screen. Textual or graphic information may be entered by the user through the input device.

In one embodiment, when mobile device 102 is initially connected to external display device 606 via connection 108, the display 608 may be driven to display the same visual information as was displayed on display 210 just prior to the connection (i.e., the mobile device 102 may stay in the same state). In another embodiment, display 608 may be driven to show a startup screen and the mobile device 102 may move to a startup state such that upon forming connection 108 the user is always presented with the same initial visual information. Further, when the connection 108 is broken between mobile device 102 and external display device 606, the display 210 may be driven to display the same visual information as was displayed on display 608 just prior to the breaking of the connection, and the mobile device 102 may stay in the same state. In another embodiment, display 210 may be driven to show a startup screen and the mobile device 102 may move to a startup state such that upon breaking connection 108 the user is always presented with the same initial visual information.

In some embodiments, the proximity of the mobile device 102 to the external device 606 causes the devices to automatically pair and form a connection 108. In some embodiments, the mobile device 102 and external display device 606 exchange information relating to the capabilities of each device and automatically determine how to adjust the display 210. In other embodiments, the user is queried as to the capabilities of mobile device 102 and/or external device 606 (e.g., touch-screen, non touch-screen). The user may be also queried as to the user's preferences (e.g., turn off backlight, leave backlight on). The user may be queried on mobile device 102 and/or external display device 606 and may receive input via either device or some external device.

In some embodiments, the mobile device 102 and/or the external device 606 are able to detect a wireless or wired connection, which is formed automatically based on proximity of the devices, or by connecting a wire between the devices. In other embodiments, the user initiates the connection 108 through input on the mobile device 102 and/or the external device 606.

Figure 5:
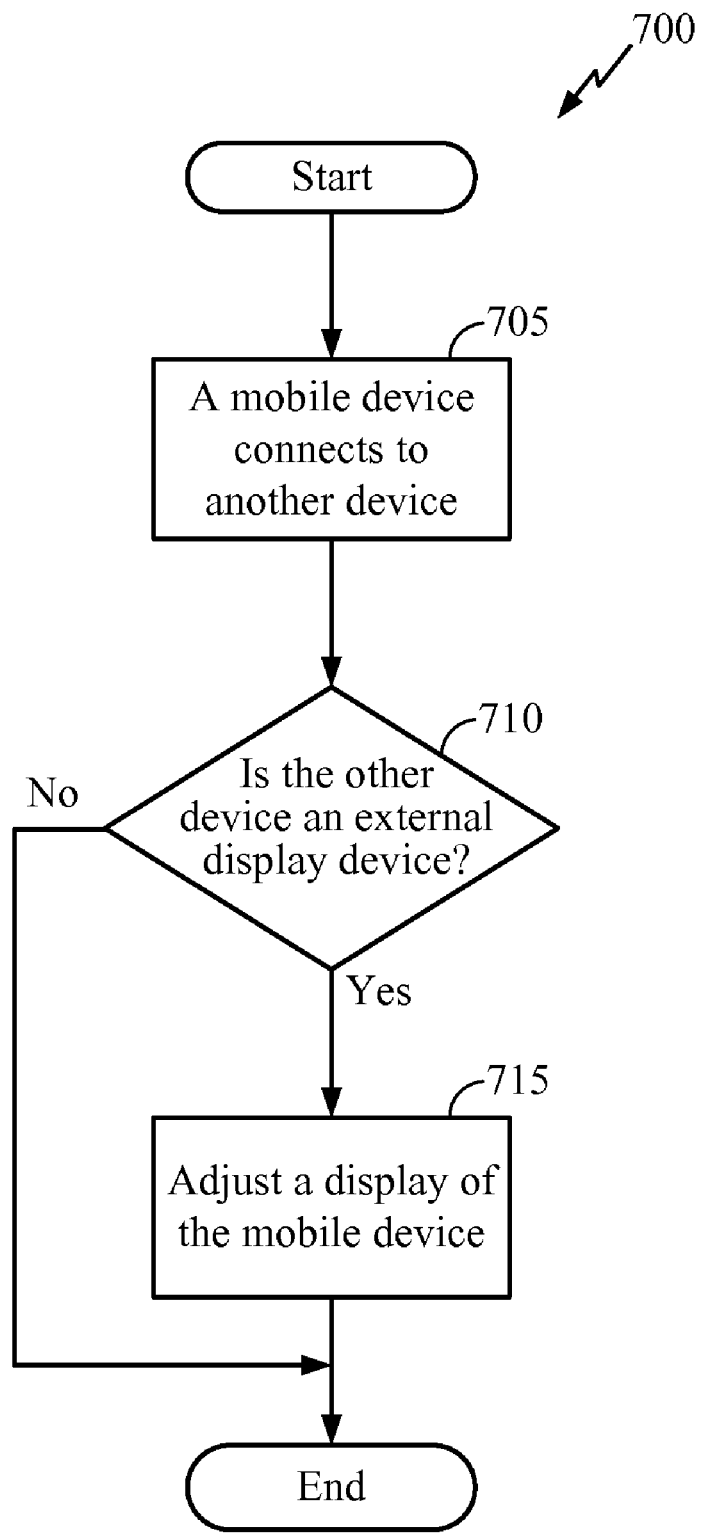
FIG. 5 is a flowchart of an embodiment of a process of adjusting power sent to a display of a mobile device shown in FIGS. 1 and 4.

FIG. 5 is a flowchart of an embodiment of a process of adjusting power sent to a display of a mobile device shown in FIGS. 1 and 4. At a step 705, the mobile device 102 connects to another device. Continuing at a step 710, the mobile device 102 determines whether the connected device is an external display device (e.g., the external display device 606). If the mobile device 102 determines the connected device is not an external display device, the process 700 ends. If the mobile device 102 determines the connected device is an external display device, the process 700 continues to a step 715. At the step 715, the display controller 224 adjusts the display 210 of the mobile device 102. The display controller 224 may adjust the display 210 as discussed above with respect to FIG. 4.

Figure 6:
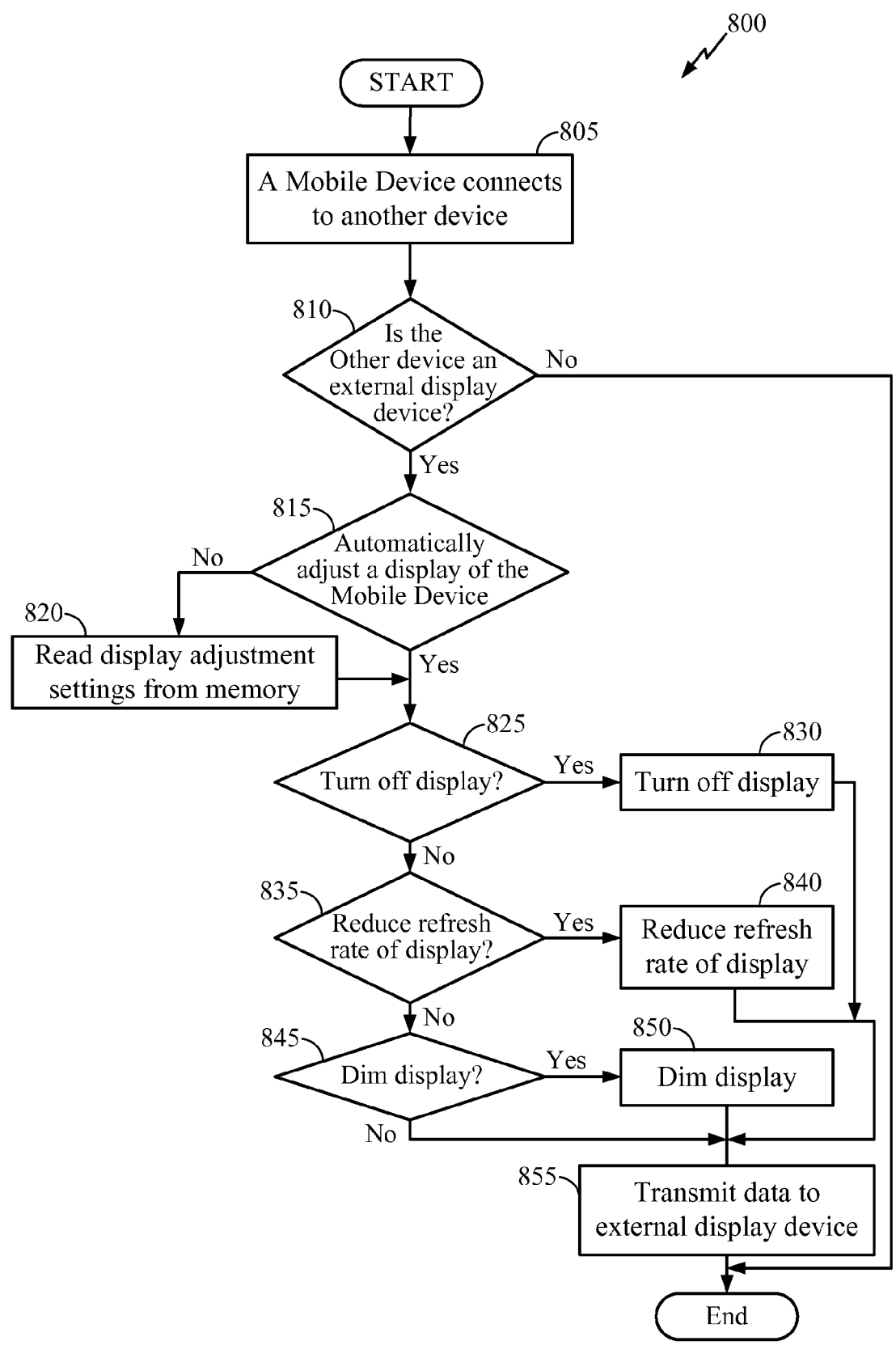
FIG. 6 is another flowchart of an embodiment of a process of adjusting power sent to a display of a mobile device shown in FIGS. 1 and 4.

FIG. 6 is another flowchart of an embodiment of a process of adjusting power sent to a display of a mobile device shown in FIGS. 1 and 4. At a step 805, the mobile device 102 connects to another device. Continuing at a step 810, the mobile device 102 determines whether the connected device is an external display device (e.g., the external display device 606). If the mobile device 102 determines the connected device is not an external display device, the process 800 ends. If the mobile device 102 determines the connected device is an external display device, the process 800 continues to a step 815. At the step 815, the display controller 224 determines if the mobile device 102 is configured to automatically adjust the display 210 of the mobile device 102 when an external display device is connected. If at the step 815 the display controller 224 determines the mobile device 102 is configured to automatically adjust the display 210, the process 800 continues to the step 825. If at the step 815 the display controller 224 determines the mobile device 102 is not configured to automatically adjust the display 210, the process 800 continues to the step 820. Further, at the step 820, the display controller 224 reads information indicative of how to adjust the display 210 from the memory 204.

Continuing at the step 825, the display controller 224 determines if the mobile device 102 is configured to turn off the display 210 of the mobile device 102 when an external display device is connected. If at the step 825 the display controller 224 determines the mobile device 102 is not configured to turn off the display 210, the process 800 continues to the step 835. If at the step 825 the display controller 224 determines the mobile device 102 is configured to turn off the display 210, the process 800 continues to the step 830. Further, at the step 830, the display controller 224 turns off the display 210 and proceeds to a step 855.

At the step 835, the display controller 224 determines if the mobile device 102 is configured to reduce a refresh rate of the display 210 of the mobile device 102 when an external display device is connected. If at the step 835 the display controller 224 determines the mobile device 102 is not configured to reduce a refresh rate of the display 210, the process 800 continues to the step 845. If at the step 835 the display controller 224 determines the mobile device 102 is configured to reduce a refresh rate of the display 210, the process 800 continues to the step 840. Further, at the step 840, the display controller 224 reduces a refresh rate of the display 210 and proceeds to a step 855.

At the step 845, the display controller 224 determines if the mobile device 102 is configured to dim the display 210 of the mobile device 102 when an external display device is connected. If at the step 845 the display controller 224 determines the mobile device 102 is not configured to dim the display 210, the process 800 continues to the step 855. If at the step 845 the display controller 224 determines the mobile device 102 is configured to dim the display 210, the process 800 continues to the step 850. Further, at the step 850, the display controller 224 dims the display 210 and proceeds to a step 855.

At the step 855, the mobile device 102 transmits data to the external display device for display.

Figure 7:
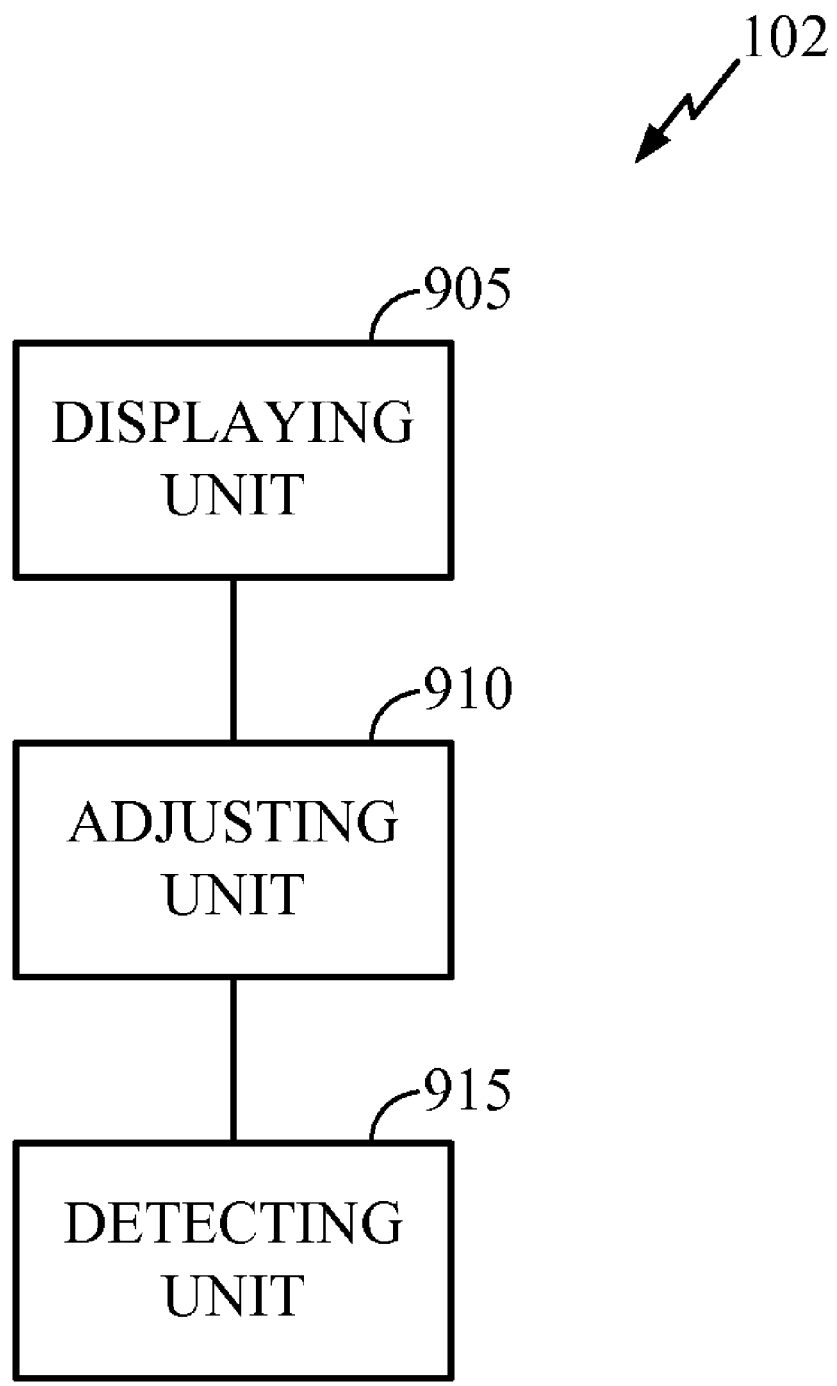
FIG. 7 is a block diagram illustrating another example of a mobile device.

The functionality described herein (e.g., with regard to one or more of the accompanying figures) may correspond in some aspects to similarly designated "means for" functionality in the appended claims. Referring to FIG. 7, the mobile device 102 is represented as a series of interrelated functional modules.

FIG. 7 is a block diagram illustrating another example of a mobile device. As shown, the mobile device 102 may comprise a displaying unit 905, an adjusting unit 910, and a detecting unit 915. The displaying unit 905 may correspond at least in some aspects to, for example, a display as discussed herein. The adjusting unit 910 may correspond at least in some aspects to, for example, a display controller and/or a processor as discussed herein. The detecting unit 915 may correspond at least in some aspects to, for example, a network interface and/or a processor as discussed herein.

The functionality of the modules of FIG. 7 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

While the specification describes particular examples of the present invention, those of ordinary skill can devise variations of the present invention without departing from the inventive concept. For example, the teachings herein refer to networks with femto cells and macro cells but are equally applicable to networks with other topologies.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP communication, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor may read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method of displaying information from a mobile device, the method comprising:
   detecting a wireless connection between a mobile device and an external display device; and
   adjusting a display of the mobile device based on at least the detection of the wireless connection;
   wherein adjusting the display comprises turning off power to a pixel array of the display.

2. The method of claim 1, wherein adjusting the display comprises reducing a refresh rate of the display.

3. The method of claim 1, wherein adjusting the display comprises turning off a backlight of the display.

4. The method of claim 1, wherein adjusting the display comprises adjusting a brightness level of a backlight of the display.

5. The method of claim 1, further comprising detecting a connection between the mobile device and an external power source, and wherein adjusting the display comprises maintaining the display in a powered on state.

6. The method of claim 1, further comprising detecting at least one property of the external display device.

7. The method of claim 6, wherein the at least one property comprises whether the external display device comprises a touch-screen display or the external display device comprises a non-touch screen display.

8. The method of claim 7, further comprising adjusting the display of the mobile device based on the detected at least one property.

9. The method of claim 1, further comprising setting the mobile device to a first state when initially connected to the external display device, and setting the mobile device to a second state when initially disconnected from the external display device.

10. The method of claim 9, wherein the first state is different than the second state.

11. The method of claim 9, wherein the first state is substantially the same as the second state.

12. The method of claim 1, further comprising adjusting the display of the mobile device based on a battery charge level of the mobile device.

13. The method of claim 1, further comprising adjusting the display of the mobile device based on input from a user.

14. A mobile device comprising:
   a display; a first processing circuit configured to detect a wireless connection with an external display device; and
   a second processing circuit configured to adjust the display based on at least the detection of the wireless connection;
   wherein the second processing circuit is further configured to turn off power to a pixel array of the display.

15. The mobile device of claim 14, wherein the second processing circuit is further configured to reduce a refresh rate of the display.

16. The mobile device of claim 14, wherein the second processing circuit is further configured to turn off a backlight of the display.

17. The mobile device of claim 14, wherein the second processing circuit is further configured to adjust a brightness level of a backlight of the display.

18. The mobile device of claim 14, further comprising a third processing circuit configured to detect a connection with an external power source, and wherein the second processing circuit is further configured to maintain the display in a powered on state if at least the connection with the external power source is detected.

19. The mobile device of claim 14, further comprising a third processing circuit configured to detect at least one property of the external display device.

20. The mobile device of claim 19, wherein the at least one property comprises whether the external display device comprises a touch-screen display or the external display device comprises a non-touch screen display.

21. The mobile device of claim 20, the second processing circuit is further configured to adjust the display based on the detected at least one property.

22. The mobile device of claim 14, further comprising a third processing circuit configured to set the mobile device to a first state when initially connected to the external display device, and further configured to set the mobile device to a second state when initially disconnected from the external display device.

23. The mobile device of claim 22, wherein the first state is different than the second state.

24. The mobile device of claim 22, wherein the first state is substantially the same as the second state.

25. The mobile device of claim 14, wherein the second processing circuit is further configured to adjust the display based on a battery charge level of the mobile device.

26. The mobile device of claim 14, wherein the second processing circuit is further configured to adjust the display based on input from a user.

27. An apparatus comprising:
means for detecting a wireless connection between a mobile device and
an external display device; and
means for adjusting a display of the mobile device based on at least the detection of the wireless connection;
wherein the second processing circuit is further configured to turn off power to a pixel array of the display;
wherein the means for adjusting is further configured to turn off power to a pixel array of the display.

28. The apparatus of claim 27, wherein the means for adjusting is further configured to reduce a refresh rate of the display.

29. The apparatus of claim 27, wherein the means for adjusting is further configured to turn off a backlight of the display.

30. The apparatus of claim 27, wherein the means for adjusting is further configured to turn adjust a brightness level of a backlight of the display.

31. A non-transitory computer program product, comprising: non-transitory computer-readable medium comprising:
code for causing a computer to detect a wireless connection between a mobile device and an external display device; and
code for causing a computer to adjust a display of the mobile device based on at least the detection of the wireless connection;
wherein the computer-readable medium further comprises code for causing a computer to turn off power to a pixel array of the display.

32. The computer program product of claim 31, wherein the computer-readable medium further comprises code for causing a computer to reduce a refresh rate of the display.

33. The computer program product of claim 31, wherein the computer-readable medium further comprises code for causing a computer to turn off a backlight of the display.

34. The computer program product of claim 31, wherein the computer-readable medium further comprises code for causing a computer to adjust a brightness level of a backlight of the display.

* * * * *